March 8, 1938.                     R. A. HAMILTON                     2,110,221
                               DEFECTIVE LIGHT INDICATOR
                                 Filed March 12, 1936
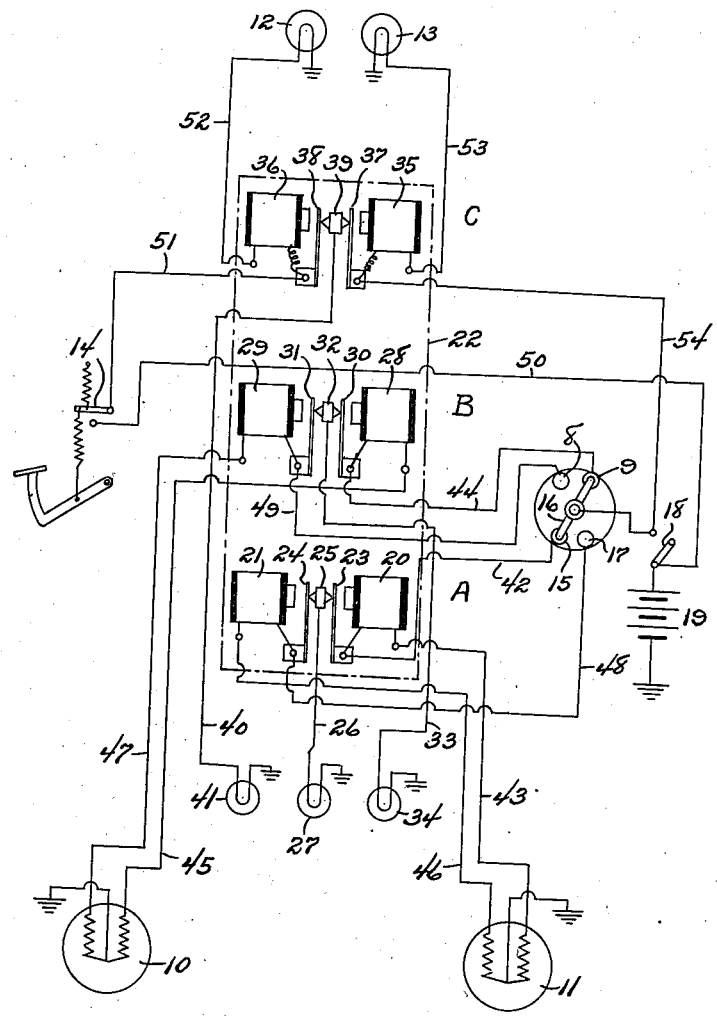
Robert A. Hamilton
INVENTOR
BY Victor J. Evans & Co.
ATTORNEY Patented Mar. 8, 1938

2,110,221

UNITED STATES PATENT OFFICE 2,110,221

DEFECTIVE LIGHT INDICATOR

Robert A. Hamilton, Newport News, Va.

Application March 12, 1936, Serial No. 68,556

1 Claim. (Cl. 177—311)

This invention relates to defective light indicators for automobiles and has for an object to provide both visible and audible signal devices whereby the driver of the car without leaving his seat will be instantly advised whenever a light is burned out.

In automobile lighting systems the headlights are each on two circuits and ordinarily there is no way of determining while driving which lights are burning. The present invention provides a telltale system whereby the driver will be aware at all times which lights are burning.

The invention comprises briefly a plurality of units each comprising two relays mounted oppositely to each other. Each relay has a relay armature mounted over its core. Both armatures have contacts which make contact with a fixed contact between them, and the fixed contact is connected with a pilot signal light on the instrument board.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

The figure is a diagrammatic view of an automobile lighting system equipped with my improved defective light indicator.

Referring now to the drawing in which like characters of reference designate similar parts in the various views, 10 designates the right headlight, 11 the left headlight, 12 the stop light, and 13 the tail light, of a conventional automobile lighting system. As usual the stop light is operated by a brake pedal operated switch 14 and the light switch for the headlights is of the double pole variety including contacts 9 and 15 which are cross connected to energize one of the filaments in both headlights when the switch arm 16 is turned in one direction, and contacts 8 and 17 which control the other filaments of both headlights when the switch arm is turned in the opposite direction. When the lighting switch 18 is closed current is supplied from the battery 19 to the tail light and to the headlight switch. These parts are of conventional type to be found on the lighting systems of all cars today.

The defective light indicator comprising the subject matter of this invention includes a plurality of units of relays designated A, B, and C.

The unit A comprises a pair of relays 20 and 21 which are disposed opposite each other upon a suitable base 22. The relay 20 has a relay armature 23, while the relay 21 has a relay armature 24 mounted over its core. These relay armatures make contact with the fixed contact 25 which is arranged between them and which is connected by a wire 26 with the left headlight signal or pilot light 27 located on the instrument board.

The unit B likewise comprises a pair of opposed relays 28 and 29 having respective relay armatures 30 and 31 which engage a fixed contact 32 located between them. A conductor wire 33 connects the fixed contact to a right headlight pilot light 34 located on the instrument board.

The unit C also comprises a pair of opposed relays 35 and 36 having respective relay armatures 37 and 38 which engage a fixed contact 39 that is connected by a wire 40 to a combined stop and tail pilot light 41 located on the instrument board.

The electrical connections are as follows. The contact 15 of the lighting switch is connected by a wire 42 to the relay armature 23 of the relay 20 and one end of the coil of the relay is also connected to the armature. The other end of the coil of the relay is connected by a wire 43 to one of the filaments of the left headlight 11, for example, the bright filament. The mating contact 9 of the switch is connected by a wire 44 to the relay armature 30 of the relay 28 and the armature is connected to one end of the coil of the relay while the other end of the coil is connected by a wire 45 to one of the filaments in the right headlight 10, for example, the bright filament.

When the lighting switch arm 16 is in the position illustrated current will flow from the battery through the wire 42, relay 20, wire 43 to the bright filament of the left headlight 11 and at the same time current will flow from the contact 9 to the wire 44, relay 28, and wire 45 to the bright filament of the right headlight 10.

Should, for example, the bright filament of the left headlight burn out, the circuit through the relay 20 will be broken at this point whereupon the relay will become de-energized and its armature 23 will be released and will make contact with the fixed contact 25 whereby the current will now flow from the battery to the wire 42, armature 23, fixed contact 25 and wire 26 to light the left headlight pilot light on the instrument board.

In the same manner if the bright filament of the right headlight should burn out the circuit through the relay 28 will be broken at this point and current will now flow from the battery through the wire 44 to the relay armature 30, and since the relay has become deenergized, the armature will be in contact with the fixed contact 32 so that current will flow through the fixed contact 32 and wire 33 to the right headlight pilot light 34 on the instrument board and light this light.

By again referring to the figure it will be seen that the relay armature 24 is connected to one end of the coil of the relay 21 and the other end of the coil is connected by a wire 46 to the dim filament in the left headlight 11. Assuming for the moment that the bright headlights are being used and that the bright filament in the left headlight 11 has burned out, it will now be pointed out that in addition to current flowing through the fixed contact 25 to light the pilot light 27 on the instrument board the current will divide at the fixed contact 25 and pass through the relay armature 24, then through the relay 21, and then through the wire 46 to the dim filament of the left headlight and complete a circuit through the relay 21. Thereupon the relay 21 will be energized to attract its relay armature 24 but immediately the armature leaves the switch contact 25 the circuit through the relay 21 will be broken, the result being that the armature 24 will be vibrated as the circuit through the relay is alternately made and broken and produce a buzzing audible signal simultaneously with the lighting of the pilot lamp 27.

In like manner should the bright filament of the right headlight 10 burn out, thereby causing the right pilot light 34 to glow, it will be seen by referring to unit B that the current will pass through the relay armature 30, through the fixed contact 32, relay 29, and wire 47 to the dim filament of the right headlight with the result that the relay 29 will be alternately energized and de-energized as the armature 31 makes and breaks contact with the fixed contact 32 to create the audible buzzing signal.

The contact 17 on the lighting switch is connected by a wire 48 to the relay armature 24 of the relay 21, to connect the solenoid in series with the dim filament in the left headlight 11 through the wire 46. Likewise the contact 8 is connected by a wire 49 to the relay armature 31 of the relay 29 which is connected in series with the dim filament of the right headlight through the wire 47.

Now, should the dim filament of the left headlight burn out, while the dim headlights are in use, the current will divide at the fixed contact 25 and part will pass through the relay armature 23 and relay 20 which is connected in series with the bright filament in the left headlight through the wire 43. The consequent energizing and de-energizing of the relay 20 will cause the armature 23 to vibrate simultaneously with the glowing of the left headlight pilot light 27 so that both audible and visible means will be available for indicating to the driver that the dim filament of the left headlight is extinguished.

If the dim filament in the right headlight burns out while the dim headlights are in use, in the same manner as just described, the current will divide at the fixed switch contact 32 and pass through the armature 30 and through the relay 28 and through the wire 45 to the bright filament of the right headlight 10. The relay will be de-energized when the armature 30 is attracted and break the circuit at the fixed contact 32, this alternate making and breaking of the circuit producing a buzzing signal as the armature vibrates simultaneously with the lighting of the right headlight pilot light 34.

The relays 35 and 36 of the unit C control the lighting of the pilot lamp 41 and the buzzing signal when either the stop light or the tail light filament of a combined stop and tail light is burned out. For this purpose a wire 50 connects the battery with the brake pedal switch 14 and the latter is connected by a wire 51 to the armature 38 of the relay 36 which is connected in series with the armature and with the filament of the stop light 12 by a wire 52. Should the stop light filament burn out the circuit through the relay will be broken whereupon the armature 38 will make contact with the fixed contact 39 and cause the combined stop and tail light pilot light 41 to glow.

At the same time the current will pass through the armature 38, fixed contact 39, relay armature 37 of the relay 35, through a wire 53 which leads to the filament of the tail light 13. The relay 35 will be alternately energized and de-energized as the armature 37 makes and breaks the circuit at the fixed contact 39 to create a buzzing signal simultaneously with the glowing of the pilot lamp 41.

A wire 54 leads from the lighting switch 18 to the armature 37 and since the armature is connected in series with the relay 35 and the filament of the tail light 13 through the wire 53, when the filament in the tail light is burned out the circuit through the relay will be broken to release the armature 37 to make contact with the fixed contact 39 and energize the stop and tail pilot light 41. Simultaneously with the glowing of this pilot light the current will pass through the armature 37, fixed contact 39, armature 38, relay 36 to the stop light filament, and, as above described, immediately this circuit is made it is broken by the armature 38 leaving the fixed contact 39, to produce the buzzing audible signal simultaneously with the glowing of the pilot light 41.

Since the operation of the device has been described as the description of the parts progressed, it is thought that the invention will be fully understood without further explanation.

What is claimed is:

In a filament failure detector for a lighting system including two filaments and selective control means for closing the circuits to said filaments, the combination of two relays one for each filament having their coils in alignment with each other and their armatures disposed between the coils, a stationary contact between the armatures out of engagement with either armature when its corresponding coil is energized and in engagement when its coil is de-energized, a source of electrical energy, means connecting one terminal of the source through the selective control means to one terminal of one coil, means connecting the other terminal of said coil to one terminal of its corresponding filament, means connecting the other terminal of said filament to the other terminal of the source, means connecting the corresponding armature to the first-named terminal of said coil, identical connection for the other coil, filament, and armature through the selective control means, and a pilot lamp having one of its terminals connected to the said stationary contact and its other terminal to the second-named terminal of the source, whereby when the selective control means is effective to close either one of the two circuits to the corresponding filament and said filament is burned out the corresponding armature will engage the stationary contact to thereby energize the pilot light and simultaneously direct current through the other armature and coil and its associated filament to thereby produce a buzzing sound and flicker said associated filament.

ROBERT A. HAMILTON.